Dec. 4, 1951 P. I. SCHULTZ ET AL 2,577,378
HOUSING FOR VEHICLE HOISTS
Filed April 21, 1949 2 SHEETS—SHEET 1
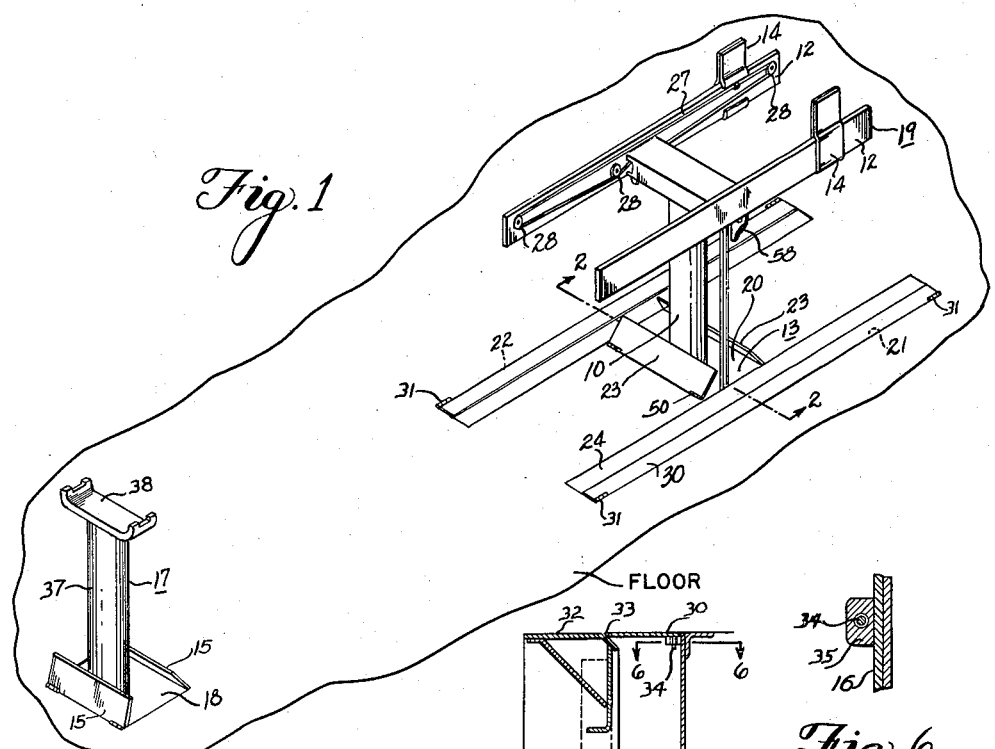
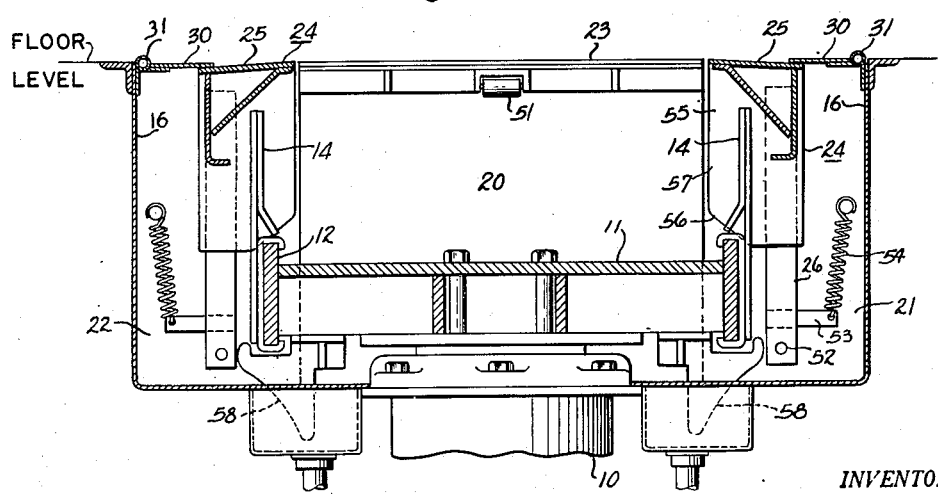
INVENTOR.
PAUL I. SCHULTZ
BY JAMES J. PELOUCH
Woodling and Kroet
attys INVENTOR.
PAUL I. SCHULTZ
BY JAMES J. PELOUCH
Woodling and Krost
attys Patented Dec. 4, 1951

2,577,378

UNITED STATES PATENT OFFICE 2,577,378

HOUSING FOR VEHICLE HOISTS

Paul I. Schultz and James J. Pelouch, Cleveland, Ohio, assignors, by mesne assignments, to Harold C. Schott, Cleveland, Ohio Application April 21, 1949, Serial No. 88,784

5 Claims. (Cl. 254—89)

This invention relates to automobile lifts in general, but relates more particularly to a lift which is retractable into a covered pit below floor level, and is related specifically to automatically controlled covers for a lift pit adapted to open and allow the superstructure of a lift to pass thereby and immediately close thereafter to cover the pit and provide useful floor area.

Prior automobile lifts generally consisted of a single hydraulic post an H-shaped superstructure. The post operates in a cylinder extending into the floor of the service station or garage and the superstructure rests upon the floor. A vehicle to be lifted is driven upon the superstructure and then both the superstructure and the vehicle are lifted off of the floor by the hydraulic post.

Two-post lifts have been developed in which one post is adapted to contact the front axle of a vehicle, and a second post is adapted to contact the rear axle of a vehicle. Many advantages in automotive servicing and repair work are obtainable by two-post lifts. The automatically operated covers for a pit of this invention, into which the entire lift including the superstructure can withdraw and be covered, has made the two-post lift much more valuable. The large amount of floor space normally occupied by an automobile lift is available in the modern garage for other purposes when the lift is not being used. The space thus saved is equivalent to an entire supplemental garage in service stations and service garages having numerous lifts.

Therefore, an object of this invention is to provide an improved vehicle lift.

Another object of this invention is to provide a pit below floor level for a vehicle lift, and provide doors to cover the pit at all times except when the superstructure of the lift is passing in or out of the pit.

Another object of this invention is to provide automatically operable and closable doors for a lift pit.

Another object of this invention is to provide laterally movable doors for the floor pit of a vehicle lift.

A still further object of this invention is to provide two floor doors having plates adapted to cover the floor pit of a vehicle lift, each plate being less than the width of the pit, and moving one of the floor plates laterally to an open position under the other floor plate.

Yet another object of this invention is to provide a cam surface on the door having the laterally movable floor plate, the cam being adapted to be contacted by the superstructure of the lift as it moves upwardly and move the floor plate to an open position, and provide a cam surface on the lift adapted to contact the floor plate as the lift moves downwardly into the pit and move the floor plate to an open position, and to provide means for moving the floor plate to a closed position when not constrained by either said cam surfaces.

Other objects and a fuller understanding of this invention may be had by referring to the following description and claims, taken in conjunction with the accompanying drawing, in which:

Figure 1 is a perspective view of a two-post lift which is retractable within a covered floor pit, the rear post being provided with the automatically operable doors of this invention;

Figure 2 is a partial cross-sectional view taken from the position indicated by the line 2—2 of Figure 1, but with the lift entirely retracted into the pit and the doors being closed thereover;

Figure 5 is a physical structure modification of the pivot doors and bridge doors to close the floor pit; and Figure 6 is a section along line 6—6 of Figure 5.

Figure 3:
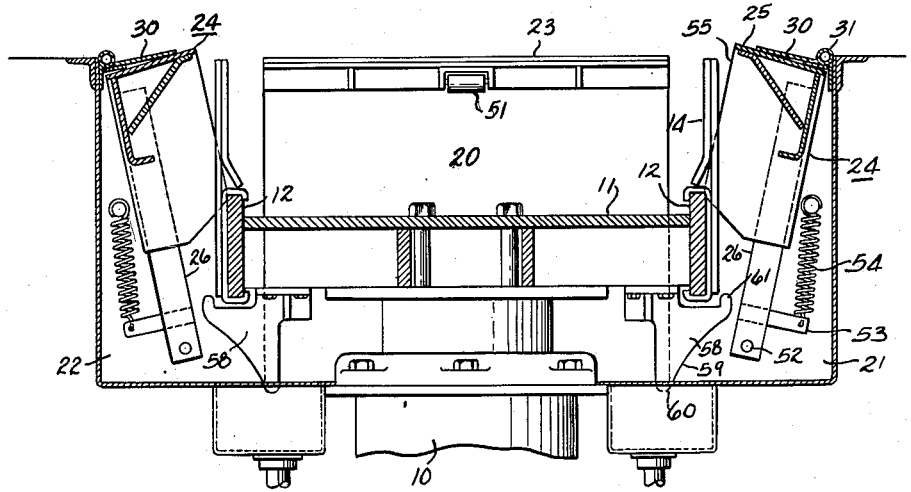
Figure 3 is a view, taken from the same position as Figure 2, with the lift in the first stages of ascending out of the pit, or in the final stages of descending into the pit.

In the Figure 1 of the drawing the general plan of a two-post lift is illustrated having a front lift 17 of conventional construction into a lift pit 13 having a housing 16. The principles of this invention, and an actual embodiment of the invention, are illustrated only in connection with the rear lift 19, because substantially all lifts provided for service stations and garages require only that the rear lift 19 has a long superstructure to compensate for the differences between the wheel bases of various makes and models of vehicles. The front lift 17 comprises a lift post 37 and a cross saddle 38. The saddle 38 is quite small and may be covered by any suitable type door, such, for example, as hinged doors 15. The lift 17 will push the doors 15 open, and the doors 15 will be lie against the post 37 when lift 17 is raised. The lift 17 and doors 15 are provided with smooth sliding contact surfaces designed to permit passage of the lift 17 upwardly and downwardly past the doors, and the doors 15 will close over the pit 18 by gravity when the lift 17 is recessed into pit 18. The pit 18 is relatively small, and therefore great concern is not required as to whether the pit 18 is closed after the lift 17 extends therethrough. It is to be understood, of course, that the principles of this invention may very readily be applied to the front lift 17, but for the purpose of setting forth the invention herein, the front lift 17 and the pit 18 are not illustrated with the automatic doors of the present invention, but the invention is illustrated in the rear lift 19 and the pit 13.

The rear lift 19 comprises a hydraulic post 10 of suitable standard design and construction, having a cross member 11 bolted or otherwise suitably fastened on the end of the post. The drawings illustrate the position of two spaced, longitudinally extended, upright members 12 securely mounted on each end of the cross member 11. The cross member 11, and the members 12, constitute an H-shaped superstructure mounted on the end of the hydraulic post 10 for elevational movement to contact the undercarriage of a vehicle and lift the vehicle. The drawings also illustrate two longitudinally shiftable axle-engaging blocks 14, one mounted on each of the longitudinal members 12, which may be longitudinally shifted by any suitable means upon the longitudinal members 12 to engage the axle of a vehicle parked over the lift pit 13. The particular embodiment of the lift illustrated includes chains 27 looped around sprockets 28 and suitably driven by any convenient means, either manually or by power, and preferably remotely controlled. In other words, the vehicle is driven over the lift with the front axle thereof positioned over the front lift 17, and the rear axle is positioned over the superstructure of the rear lift 19. The axle-engaging blocks 14 are thereafter shifted, either by hand shifting or by improved remote control shifting, to a position below the rear axle of the vehicle. Thereafter, as the two posts of the lift are raised the axles of the vehicle will be accurately engaged and the vehicle will be lifted free of interfering lift structure.

As previously stated, the rear lift 19 is generally provided with a longitudinally extending superstructure in order that the two-post lift may accommodate vehicle wheel bases within a wide range of variation. Accordingly, in order to retract the large superstructure within a floor pit when the lift is not in service, relatively large floor openings are required. These large floor openings, if left uncovered, constitute a physical hazard for the service attendant, as well as a nuisance because of the fact that a dropped tool will invariably roll into an open pit.

In the Figure 1 of the drawings, a perspective view of the improved pit covering means of this invention is illustrated, and in the remaining views the details of construction and operation are set forth. The lift 19 is illustrated with an H-shaped superstructure, and the pit 13 is suitably formed with an H-shape to conform to the shape of the superstructure. The pit 13 includes a horizontal or cross pit 20, and two spaced longitudinally extending side pits 21 and 22. The horizontal pit 20 is adapted to be closed by two hinged doors 23 which are suitably mounted on the sides of the horizontal pit 20 by hinges 50 and meet in the center of the pit. Any suitable bracing means may be provided to support the doors 23 when they are in the closed position.

Figure 4:
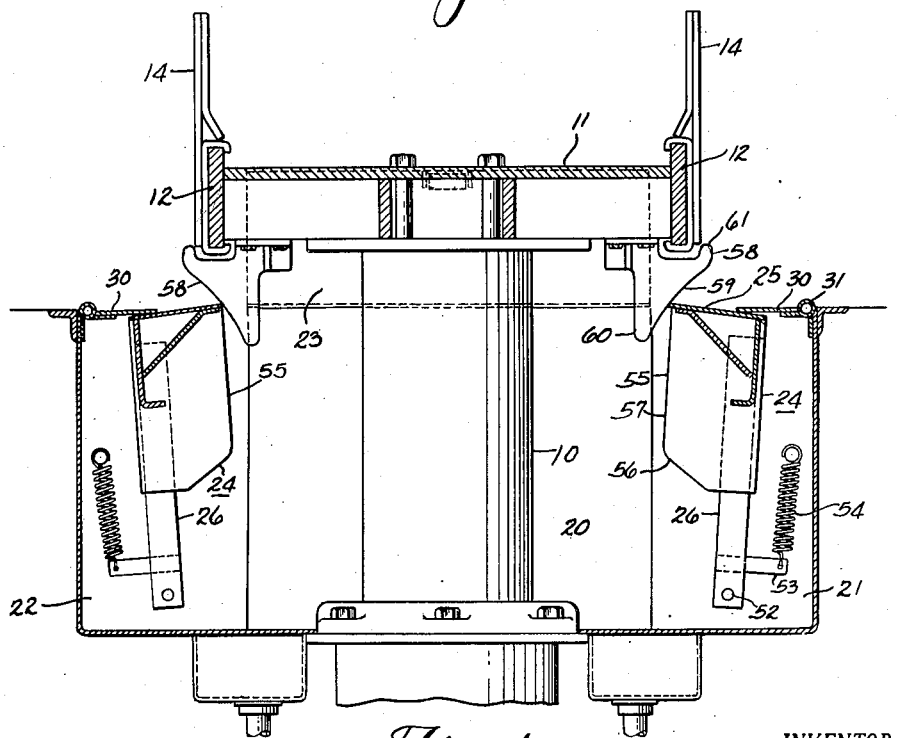
Figure 4 is a view taken from the same position as Figure 2 with the lift superstructure at a position of descent just entering into the lift pit.

In the usual lift structure, the spaced longitudinal members 12 are considerably less than the width of an automobile frame, and therefore the length of the horizontal pit 20 and the doors 23 is comparatively short. Therefore, the doors 23 are permitted to stand open in contact with the hydraulic post 10 when the lift 19 is extended out of the pit 13, rather than provide doors to close around the post 10. In the Figure 4 of the drawings, the lift 19 is shown extended from the pit 13 with the doors 23 leaning against the post 10. In other words, as the rear lift 19 is extended from the pit, the doors 23 are opened by the lift 19 pushing the doors, and they are merely pushed open far enough to allow the cross member 11 and the post 10 to pass therethrough. The doors 23 constantly lie inwardly against the post 10 by gravitational force. Rollers 51 are provided on the doors to reduce wear on the post 10 and permit smooth upward and downward passage of the post 10 and cross member 11 past the doors 23.

The longitudinal side pits 21 and 22 are illustrated as being provided with the improved pit closure doors of this invention. These improved doors comprise generally a pivot door 24 adapted to swing laterally with respect to a pit, and a bridge door 30 positioned to bridge the space between the side of the pit and the edge of the pivot door 24. Because the actual construction and the principles of operation of the doors of this invention, whether for the side pit 21 or 22 or for any other closable pit, are substantially the same, the improved doors will be described in connection with the longitudinal side pit 21. It is to be understood that the improved doors described in connection with the pit 21 may be used to enclose any container, even though the container is not actually below floor level, and is particularly adapted to close the container in which a superstructure of a vehicle lift may be enclosed below a floor level.

The pivot door 24 includes a floor plate 25 and a pivot arm 26. The floor plate 25 has a width which is substantially less than the width of the pit 21, but is substantially as long as the pit 21. The floor plate 25 is securely mounted on one end of the pivot arm 26, and the pivot arm 26 is in turn pivotally mounted at the opposite end thereof by means of a pivotal mounting pin 52 positioned near the bottom of the pit 21. Thus, the floor plate 25 is normally positioned substantially flush with the top of the pit 21, and will cover a portion of the pit 21. Furthermore, the floor plate 25 may be pivoted about the pivot pin 52 from a first closed position as illustrated in the Figure 2, to an open position as illustrated in the Figure 3. Convenient urging means is provided, however, to urge the pivot door 24 to the closed position of Figure 2. In the illustrated embodiment of the invention, this urging means comprises a lever arm 53 and a spring 54.

As illustrated in the Figure 2, the floor plate 25, when urged to the closed position by the spring 54, is directly over the longitudinal members 12 of the lift superstructure. As previously stated, the floor plate 25 is less than the width of the pit 21, and specifically, it is proportioned with respect to the width of the pit 21 in order that the pivot arm 26 may move the floor plate 25 laterally with respect to the pit 21 far enough to open the pit 21 for free passage of the longitudinal members 12 upwardly and downwardly into the pit 21. In the illustrated embodiment of the invention, the length of the pivot arm 26 is sufficiently long that the arcuate path of the floor plate 25 approaches close to a straight line lateral movement. Therefore, although means may conveniently be provided to shift the door 24 with a straight-line lateral movement, the pivotal mounting arrangement illustrated provides the desired automatic closing with substantial advantages in mechanical simplicity over other types of door mountings. It is desired to particularly call attention to the fact that the floor plate 25 of this embodiment of the invention is always substantially flush with the floor level, rather than extending above or below the floor level during open positions of the door.

The pivot door 24 is provided with a cam member 55 having a cam surface 56. The cam member 55 is mounted on the pivot door 24 with the cam surface 56 positioned to be contacted by the longitudinal member 12. Contact of the cam surface 56 by the longitudinal member 12 will exert a lateral rotating component of force upon the pivot door 24, and will swing the door 24 against the urge of the spring 54 to the open position illustrated in Figure 3 of the drawings. In Figure 3 of the drawings, the superstructure of the lift has been advanced upwardly until the longitudinal member 12 has forced the pivot door 24 to its furthest open position. It may be seen in the Figure 3 that the edge of the cam surface 56 will remain in contact with the side of the longitudinal member 12 until the longitudinal member 12 has ascended thereby, and thereafter the front edge 57 of the cam 55 will contact the lower edge of the longitudinal member 12 and gradually allow the door 24 to move toward the closed position. After the longitudinal member 12 has ascended past the top of the floor plate 25, the spring 54 is free to pivot the door 24 back to the closed position illustrated in Figure 2. However, contrary to the illustration in Figure 2, the superstructure of the lift will be above the floor surface of the pit 13.

As thus far described, the pit 24 is partially closed by the floor plate 25. The bridge door 30 is provided to close the space between the edge of the floor plate 25 and the edge of the pit 21 when the floor plate 25 is in the closed position of Figure 2. The bridge door 30 is suitably pivoted, such as by hinges 31, on the side of the pit 21, and extends across the intervening space to the floor plate 25. As illustrated in this preferred embodiment, the bridge door 30 is wide enough to extend to an overlapping position with respect to the closed door 24, and therefore will be supported by the pivot door 24. The bridge door 30 is hinged because of the preferred pivotal mounting of the pivot door 24. Other suitable embodiments of the bridge door 30 may be provided as required by modifications of the invention within the scope of the invention. Provision has been made, as thus far described, to open the pivot doors 24 and permit the superstructure of the lift to pass upwardly out of the pit 13. After the superstructure of the lift has ascended through the doors out of the pit 13, at least the longitudinal side pits 21 and 22 are reclosed by the pivot doors 24 under the closing action of the spring 54 as described. Therefore, this invention also embodies means to automatically open the pivot doors 24 as the superstructure of the lift descends downwardly into the pit 13.

As illustrated in Figure 1 of the drawings, cam members 58 are provided on the superstructure in a position to contact the edge of the pivot doors 24. Again referring only to the door of the pit 21, and the opening cam 58 therefor, the cam 58 is provided with a cam surface 59 beginning at a lower peak end 60 on the cam 58 and ending at a laterally positioned end 61. The peak end 60 is positioned on the superstructure of the lift at any convenient location, but is laterally disposed to contact the side edge of the floor plate 25 opposite from the direction of swing of the door 24. In other words, the cam surface 59 is disposed to provide a sloping surface to contact the floor plate 25 as the superstructure of the lift descends, and push the floor plate 25 to one side in a swinging motion around the pivot pin 52. The action is substantially the reverse of the previously described cam opening action, but the cam surface is provided upon the superstructure of the lift rather than upon the door 24 itself. Thus, no cam surface on the door 24 is required to extend above the floor surface.

The lateral end 61 of the cam surface 59 is beyond the side of the lateral member 12, and therefore will pivot the pivot door 24 far enough to permit the superstructure to pass downwardly into the pit 13. As the cam 58 descends past the floor plate 25, the cam 55 will again contact the side of the longitudinal member 12 and slowly pivot the door 24 to a closed position in the reverse order as previously described in regard to opening of the pit by swinging the pivot door 24.

In Figures 5 and 6, the floor plate of pivot door 24 is represented by the reference character 32. The floor plate 32 has a tapered portion 33 adapted to act as a cam to pivot the bridge door 30. Thus, the door 30 may rest flush with respect to the top surface of the door 32 and the floor surface. This modification provides for absolute flush installations of the invention, when slight irregularity is undesirable.

Figure 6 illustrates a modification of hinge support for bridge door 30. Door 30 is provided with an insert member, illustrated in this modification as a pin 34. A bracket member 35 is secured to the side of the pit housing 16 and has an opening 36 therethrough which is considerably larger than pin 34. Therefore the bracket and pin combination will hold the door 30 in correct lateral position, but will permit the door 30 to be pushed upward far enough to allow the pivot door 24 and floor plate 32 to slide thereunder. The movement required of door 30 is slight, and the loose fit between opening 36 and pin 34 will provide the necessary support and the necessary pivotal opening movement.

Two or more spaced pin and bracket combinations may be used to support the door 30, or a bracket having a long slot rather than a round opening, and a long flange to fit the slot, may be used, if desired.

Although the fundamental features of the invention have been set forth in connection with one particular type of two-post automobile lift, it is to be understood that the closure doors of this invention are not limited to any particular type of lift or other accessories.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a vehicle lift having a superstructure adapted to lower into a pit below a floor surface, said pit having an opening with a first side and a second side, the provision of closure doors for said opening of the pit comprising, a floor plate having a width dimension to cover less than the full opening of said pit, said floor plate mounted for lateral shifting movement between a first position with the floor plate against said first side of said pit and second position with said floor plate away from the said first side of said pit, movement of said floor plate between said first and second positions being generally laterally across the pit opening near floor level, a bridge door swingably mounted substantially at floor level to the second side of said pit opening, said bridge door having a width dimension to extend from said second side to an overlapping position on top of the floor plate during all positions of said floor plate, said bridge door resting on said floor plate at all positions, means urging said floor plate and carriage to said first position, and actuating means operable by vertical movement of said lift to force said floor plate to said second position.

2. Closure doors for the floor pit of a vehicle hoist comprising a pivot door including a floor plate adapted to close less than the width of the pit, a pivot arm having a first end portion secured to said floor plate, said pivot arm extending into said pit to form a second end portion, pivot means mounted a distance below said floor plate within said pit, said second end portion mounted pivotally on said pivot means, said floor plate being pivotal about said pivot means as a center of swing to open said pit, a bridge door adapted to bridge the portion of said pit not covered by said pivot door, said bridge door being pivotally supported at one side on the edge of the pit and resting at the other side of said floor plate of the pivot door.

3. In a vehicle lift having a superstructure adapted to lower into a pit below a floor surface, the provision of openable door means adapted to cover said pit comprising, first and second door plates, said first door plate being mounted for reciprocable movement in a path having a first terminus with the first door plate held in a pit closing position, said path having a second terminus with the first door plate held in a pit opening position, said path being in a generally lateral direction across said pit substantially at floor level, said second door plate being swingably mounted at one side of said pit, said second door means extending from said one side of the pit and resting in an overlapping position upon said first door means in both said first terminus and second terminus positions.

4. A vehicle lift structure having a longitudinal rail member, a pit below floor level, said pit having a longitudinal section, an elevator post to raise said rail member from a rest position within said pit to an elevated position above said pit, and pit door means to cover said longitudinal section of said pit, said pit door means including first and second door plates, said first door plate being mounted for reciprocable movement in a path having a first terminus with the first door plate held in a pit closing position, said path having a second terminus with the first door plate held in a pit opening position, said path being in a generally lateral direction across said pit substantially at floor level, said second door plate being swingably mounted at one side of said pit, said second door means extending from said one side of the pit and resting in an overlapping position upon said first door means in both said first terminus and second terminus positions, cooperating cam surfaces on said lift and on said first door plate positioned to contact upon vertical movement of the lift relative to the first door plate and move said first door plate toward said second terminus.

5. Closure doors at floor level for the pit of a vehicle hoist comprising, a first floor plate less than the width of said pit, a pivot arm having a first end and a second end, said first floor plate being secured to said first end, pivot means mounted in said pit, said second end of the pivot arm mounted pivotally on the pivot means, said first floor plate being swingable on said pivot arm to a closed position against one side of said pit substantially at floor level, a second floor plate having a first edge hinged to the opposite side of said pit and extending to rest upon the surface of said first floor plate, said first floor plate being swingable on said pivot arm to an open position under said second floor plate, and means to swing said first floor plate on said pivot arm means.

PAUL I. SCHULTZ.
JAMES J. PELOUCH.

REFERENCES CITED

The following references are of record in the file of this patent:

UNITED STATES PATENTS

| Number | Name | Date |
|---|---|---|
| 982,333 | Wilson | Jan. 24, 1911 |
| 2,443,405 | Thompson | Jan. 15, 1948 |